United States Patent Office 3,518,285
Patented June 30, 1970

---

3,518,285
HYDROCARBON OLEFIN OXIDATION
Donald M. Fenton, Anaheim, Calif., and Larry G. Wolgemuth, Lansing, Ill., assignors to Union Oil Company of California, Los Angeles, Calif., a corporation of California
No Drawing. Continuation-in-part of application Ser. No. 411,616, Nov. 16, 1964. This application Mar. 16, 1967, Ser. No. 623,564
Int. Cl. C07d *1/08*
U.S. Cl. 260—348.5     10 Claims

ABSTRACT OF THE DISCLOSURE

Hydrocarbon olefins are oxidized to more valuable products by contacting in liquid phase the olefin with a rhenium compound and hydrogen peroxide. Hydrogen peroxide is used to maintain the rhenium compound in its higher valency for repeated oxidation of the olefin. Temperatures from −50° to 150° C. and pressures from 1 to about 250 atmospheres are used. A major product is the olefin oxide, useful as a precursor for polymers, glycols, etc.

---

This application is a continuation-in-part of application Ser. No. 411,616, filed Nov. 16, 1964 and now abandoned.

This invention relates to the oxidation of hydrocarbon olefins; and in particular, relates to the liquid phase oxidation of hydrocarbon olefins in the presence of rhenium compounds and hydrogen peroxide.

It has been shown in U.S. application Ser. No. 373,878, that hydrocarbon olefins are oxidized to valuable oxidation products when such olefins are contacted at room temperature with rhenium compounds in a liquid reaction medium. During the oxidation reaction, the rhenium compounds are reduced to a lower oxidation state ineffective to oxidize olefins and must be regenerated so they can be used again for further oxidation. Regeneration may be performed by removing all or a portion of the reaction medium which contains the reduced state of rhenium from further contact with olefins and thereafter contacting the rhenium with oxygen. A continuous regeneration method may also be used by introducing oxygen into the reaction zone to oxidize the reduced rhenium in situ in the reaction vessel. In either event, a temperature substantially higher than that required for the olefin oxidation is required for regeneration. Temperatures from about 125° to 300° C. are used with the preferred temperature being 150° to 200° C. Use of such high regeneration temperatures results in low oxidation product selectivity during the oxidation reaction. It is accordingly desirable to maintain the reaction mixture at low temperatures during both the oxidation and regeneration reactions.

It is then an object of our invention to provide a method for the regeneration of rhenium compounds reduced during the oxidation of hydrocarbon olefins.

It is an additional object of our invention to provide a continuous method for the oxidation of olefins using rhenium compounds in which the reduced rhenium compounds formed during the oxidation reaction are regenerated at a temperature lower than 150° C.

Still other objects of the invention will become apparent to those skilled in the art as the invention is better understood by reference to the detailed description appearing hereinafter.

We have discovered that hydrocarbon olefins can be oxidized to valuable oxidation products in a liquid reaction medium under relatively mild conditions in the presence of rhenium compounds, i.e., wherein the rhenium has a positive oxidation state, and hydrogen peroxide. When the hydrogen peroxide is not present in the liquid reaction medium, the rhenium compound is reduced during the oxidation reaction and cannot be used for further olefin oxidation.

In its simplest embodiment, our invention comprises contacting, at a temperature of about −50° to 150° C. and at sufficient pressure to maintain the reaction medium as a liquid, hydrocarbon olefins having 2 to 30 carbon atoms with rhenium compounds in a liquid reaction medium containing hydrogen peroxide to oxidize said hydrocarbon olefins. During the oxidation reaction, the rhenium compounds are reduced to a lower oxidation state ineffective to oxidize olefins. The thus produced rhenium is regenerated, i.e., oxidized, by the hydrogen peroxide present in the reaction medium. Water is produced during such regeneration, and accordingly, a modification of our invention comprises maintaining the reaction mixture at a temperature during the oxidation reaction sufficiently high to distill the water thus produced from the reaction medium.

Hydrocarbon olefins that can be oxidized in accordance to our invention are branched or straight chain unsaturated acyclic or cyclic olefins having one or more double bonds. Olefins having an aryl substituent such as phenyl, tolyl, etc. can also be oxidized. Low molecular weight olefins that are gaseous at ambient temperature and pressure such as ethylene, propylene, 1-butene, 2-butene, etc., can be oxidized with the method of our invention as well as hydrocarbon olefins that are normally liquid at such conditions, such as n-pentene, 3-propylhexene-1, cyclohexene, heptene, 4,4-dimethylnonene-1, cyclooctene, octene, cyclononene, 1-nonene, iso-decylene, cycloundecene, dodecene, 1-tetradecene, 6-propyldecene-1, heptadecene, 4-hexadecene, iso-octadecene, docosene, tetracosene, hexacosene, octacosene, triacontene, eicosene, etc. Examples of substituted olefins are vinyl aromatics such as styrene, alpha-methylstyrene, p-methylstyrene, p-vinylcumene, alpha-vinylnaphthalene, 1,2-diphenylethylene, allylbenzene, o-vinyl p-xylene, p-divinylbenzene, 1-allyl 4-vinylbenzene, etc. In general, olefins containing from 2 to 30 carbon atoms can be oxidized by our method with the most preferred range being from 2 to 20 carbon atoms. Relatively pure olefins can be oxidized to simplify the product recovery steps; however, it is also within the scope of the invention to oxidize olefin mixtures such as mixtures of normally gaseous hydrocarbons, normally liquid hydrocarbons or normally gaseous and normally liquid hydrocarbons.

Rhenium compounds that are suitable for use in our invention are rhenium oxides, i.e., rhenium trioxide, rhenium heptoxide, rhenium sesquioxide, etc., and other rhenium-containing compounds capable of forming rhenium oxides under reaction conditions such as alkali metal, alkaline earth metal and ammonium perrhenates, i.e., sodium perrhenate, potassium perrhenate, calcium perrhenate, ammonia perrhenate, etc.; rhenium halides, i.e., rhenium trichloride, rhenium tetrachloride, rhenium hexachloride, rhenium tetrafluoride, rhenium hexafluoride, etc.; rhenium oxyhalides, i.e., rhenium trioxybromide, rhenium oxytetrachloride, rhenium trioxychloride, rhenium oxytetrafluoride, rhenium dioxydifluoride, etc. Preferably rhenium compounds are used which are soluble in the particular reaction medium, hereafter described.

The olefin oxidation reaction of our invention is a liquid phase oxidation in which a liquid reaction medium is used containing hydrogen peroxide and an organic liquid. When the olefin reactant is in liquid state under the oxidation conditions, the olefin can conveniently be used in excess thereby serving as the reaction medium organic liquid.

Normally gaseous olefins such as ethylene and propylene can be liquefied by use of sufficiently high reaction pressures in the aforementioned reaction pressure range. Preferably, however, these olefins are introduced into the reaction zone in vapor state by bubbling the vapor through the liquid medium which can comprise an inert organic solvent, hereafter described. Unconverted vapor is withdrawn as a vapor effluent and can be recycled for further conversion. The olefin vapor can conveniently serve as a stripping medium to volatilize the water of reaction and products from the reaction zone. Prior to recycling the olefin vapor is preferably cooled to condense and separate the water and reaction products contained in the vapor effluent and the uncondensed olefin vapor is then recycled to the reaction zone.

The reaction medium can comprise an organic liquid which preferably is a solvent for the olefins and rhenium compounds. In general, any organic compound that is a liquid and which is inert under the oxidation conditions and chemically non-reactive with the olefin and olefin oxidation products can be used. Examples of suitable solvents are: aromatic hydrocarbons such as benzene, toluene, xylene, etc.; aliphatic hydrocarbons such as hexane, heptane, isooctane, nonane, decane, cyclohexane, methylcyclohexane, etc.; halogenated hydrocarbons such as chlorobenzene, 1-chloropropane, 2-chloropropane, 1,2-dichloropropane, carbon tetrachloride, n-butylbromide, isoamylbromide, isoamylchloride, trichloropropane, pentachloroethane, ethyl chloride, ethyl bromide, etc.; esters such as methyl acetate, ethyl acetate, dimethyl phthalate, ethyl propionate, n-propyl acetate, n-butyl formate, sec-butyl acetate, isobutyl acetate, ethyl butyrate, isoamyl acetate, cyclohexyl acetate, etc.; and nitriles such as acetonitrile, propionitrile, butyronitrile, etc.

Hydrogen peroxide is present in the reaction medium in amounts from about 3 to 90 percent by weight and preferably about 30 to 70 percent by weight. During the oxidation reaction, said hydrogen peroxide is converted to water. To maintain the olefin oxidation reaction, the water produced is removed from the reaction medium while hydrogen peroxide is added thereto. Such water may be removed in a separate step by distilling the reaction medium after oxidation has been discontinued. The rhenium catalyst remains in the distillation bottoms and can be reused by adding additional hydrogen peroxide to the distillation bottoms and recycling it to the reaction zone. In a continuous method the reaction medium is maintained during the oxidation reaction at a temperature sufficiently high to distill the water from the reaction medium while introducing hydrogen peroxide into contact with said medium. Suitable reaction temperatures are between about 100° and 150° C. and preferably between 100° and 120° C. Pressures from 1 to about 250 atmospheres and preferably pressures from about 200 to 2000 p.s.i. can be used.

When an organic solvent is used in the reaction medium that forms a binary solvent-water azeotrope, the olefin oxidation reaction with simultaneous water removal from the reaction medium may be conducted at a temperature below the boiling point of water. For example, when benzene is used as a solvent during the oxidation reaction, a water-benzene azeotrope is formed at a temperature of about 60° C., containing 8.9 weight percent water, which is accordingly removed from the reaction medium. The following table lists examples of organic compounds that may be used as solvents in the reaction medium to form a binary solvent-water azeotrope which is formed at temperatures below the boiling point of water.

TABLE

| Solvent | Azeotrope temp. (° C.) | Water, percent (wt.) |
|---|---|---|
| Benzene | 69.25 | 8.83 |
| Toluene | 84.1 | 13.5 |
| m-Xylene | 92.0 | 35.8 |
| Cyclohexane | 68.95 | 9.0 |
| Carbon tetrachloride | 66 | 4.1 |
| Chloroform | 56.12 | 2.8 |
| Dichloromethane | 38.1 | 1.5 |
| 1,2-dichloroethane | 72 | 19.5 |
| 1,2-dichloropropane | 78 | 12 |
| 1-chloropropane | 43.4 | 1.0 |
| 2-chloropropane | 33.6 | 1.2 |
| 1-chlorobutane | 68.1 | 6.6 |
| 1-chloro-2-methylpropane | 61.6 | 3.3 |
| 1-iodo-2-methylpropane | 95–96 | 21 |
| Chlorobenzene | 90.2 | 28.4 |
| Methyl acetate | 56.4 | 3.2–3.7 |
| Ethyl acetate | 70.38 | 8.47 |
| Isopropyl formate | 65.0 | 3 |
| Methyl proprionate | 71.4 | 3.9 |
| Propyl formate | 71.6 | 2.3 |
| Butyl formate | 83.8 | 16.5 |
| Ethyl proprionate | 81.2 | 10 |
| Isobutyl formate | 79.5 | 18.9 |
| Isopropyl acetate | 76.6 | 10.6 |
| Methyl butyrate | 82.7 | 11.5 |
| Methyl isobutyrate | 77.7 | 6.8 |
| Propyl acetate | 82.4 | 14 |
| Amyl formate | 91.6 | 28.4 |
| Butyl acetate | 90.2 | 82.7 |
| Sec-butyl acetate | 87 | 22.5 |
| Ethyl butyrate | 97.9 | 21.5 |
| Ethyl isobutyrate | 85.2 | 15.2 |
| Isoamyl formate | 90.2 | 21 |
| Isobutyl acetate | 87.4 | 16.5 |
| Ethyl valerate | 94.5 | 40 |
| Amyl acetate | 95.2 | 41 |
| Acetonitrile | 76.0 | 14.2 |
| Butyonitrile | 87.5 | 31 |

Olefin oxidation can be performed in accordance with the invention in a discontinuous batch or in a continuous process at the aforementioned temperature and pressure conditions. In the discontinuous process, olefins are contacted with a liquid reaction medium containing rhenium compound and hydrogen peroxide in excess in a reaction vessel. As the oxidation reaction proceeds the exhaustion of the hydrogen peroxide will be apparent from the formation of a black precipitate which indicates a deficiency in hydrogen peroxide in the reaction vessel. This precipitate forms when the rhenium compound has been substantially reduced to an oxidation state ineffective to oxidize olefins. The introduction of the olefin into the reaction zone is discontinued and the reaction medium is then distilled to remove the water formed during the reaction and to recover the oxidation products. The oxidation can be repeated if desired using the distillation bottoms which contain the rhenium catalyst by the addition of hydrogen peroxide and olefin to the bottoms which are recharged to the reaction zone. In the discontinuous process, the olefin oxidation can be produced at low temperatures, i.e., temperatures from above the freezing point of the reaction medium to about 150° C. and preferably from about 5° to 50° C. When such low temperatures are used, the yield of olefin oxide is increased during the reaction.

In the continuous method, olefin and hydrogen peroxide are continuously introduced into the reaction vessel as the oxidation reaction proceeds. The reactants are stirred with conventional stirring means as they are so introduced into the reaction vessel to insure complete olefin contact with the rhenium compound in the liquid reaction medium. The resulting reaction mixture is maintained at a temperature sufficiently high to distill water produced during the reaction from said mixture and remove the water as a vapor effluent from the reactor, thereby maintaining the preferred substantially anhydrous conditions in the reaction medium. By using an organic solvent that forms a binary azeotrope with water the reaction mixture can be maintained at temperatures below the boiling point of water, i.e., from about 30° to 100° C. and preferably 50° to 90° C. Organic solvent which is distilled and removed in the vapor effluent from the reaction vessel in the water-solvent azeotrope is separated from the water by well known separation means such as liquid extraction and recycled to the reaction vessel. Oxidation products are also removed from the reaction vessel and recovered by well known separation methods such as distillation. The volatile oxidation products can also be removed continuously in the vapor effluent from the reactor and purified by fractional condensation or fractionation. The products can also be continuously recovered by continuously withdrawing a portion of the reaction medium as a liquid effluent from the reaction zone and removing the oxidation products and water therefrom by distillation. The distillation residue containing the rhenium compound can then be recycled to the reaction zone. Olefin oxidation products produced during the reaction are epoxides, acids, esters, ketones, aldehydes, and ethers.

The following examples will illustrate the mode of practice of our invention and demonstrate the results obtainable thereby. All parts expressed herein are on a weight basis.

EXAMPLE 1

A 250 milliliter flask was charged with 100 parts toluene, 50 parts 1-octene and 1 part rhenium heptoxide. An aqueous solution of 30 percent hydrogen peroxide was slowly introduced into the flask and the mixture was heated to reflux at 85° C. The hydrogen peroxide addition was controlled to give either a yellow solution, indicating an excess of hydrogen peroxide, or a black precipitate, indicating a deficiency in said hydrogen peroxide. The water-toluene azeotrope distilled from the flask during reflux was cooled, the water separated therefrom and the toluene was recycled to the flask. The final organic solution in the flask was distilled to give unreacted 1-octene, toluene and the following products as determined by gas-liquid chromatography:

1,2-epoxyoctane
2-octanone
Higher boiling ketones and ethers

EXAMPLE 2

The procedure of Example 1 was repeated with the exception that benzene was used as an organic solvent rather than toluene. The reaction mixture was refluxed at a temperature of 70° C. The products produced during the reaction were the same as those produced in Example 1.

EXAMPLE 3

A 200 milliliter flask was charged with 100 parts 2-octene and 1 part rhenium heptoxide. The reaction mixture was heated to 70° C. A black precipitate formed in the flask which was readily dissolved by dropwise addition of a 30 percent aqueous hydrogen peroxide solution. Dropwise addition of the hydrogen peroxide solution was continued until 13 parts had been added. The reaction mixture was maintained at 70° C. for 12 hours at which time the final organic solution was cooled and the reaction products were determined by gas-liquid chromatography to be the following:

1,2-epoxyoctane
2-octanone
Higher boiling ketones and ethers

EXAMPLE 4

The oxidation of normally gaseous olefins is performed by charging a one-half gallon, Teflon-lined autoclave with 100 parts toluene, 100 parts propylene and 1 part rhenium heptoxide. The autoclave is closed, warmed to 50° C. and pressured to 500 p.s.i. with nitrogen. An aqueous solution of 30 percent hydrogen peroxide is then slowly introduced into the autoclave over a 20 minute reaction period. The autoclave is then cooled, depressured and opened and the liquid contents distilled to recover oxygenated products comprising propylene oxide and acetone.

The preceding examples are intended solely to illustrate the practice of our invention and to demonstrate results secured thereby. These examples are not intended to unduly limit the invention which is intended to be defined only by the steps and reagents, and their obvious equivalents, set forth in the following claims.

We claim:

1. A method for the oxidation of olefins to an oxygenated compound selected from the class consisting of epoxides and ketones of the same total carbons which comprises contacting a hydrocarbon olefin having 3 to 20 carbon atoms with a rhenium compound selected from the group consisting of rhenium oxide, alkali metal, alkaline earth metal and ammonia perrhenates, in a liquid reaction medium containing a solvent which is inert under oxidation conditions and 3 to 90 percent by weight hydrogen peroxide, said reaction medium being at a pressure sufficient to maintain said medium as a liquid and at a temperature of −50° to 150° C., sufficient to oxidize said olefin to said oxygenated compound.

2. The method of claim 1 wherein the hydrocarbon olefin is propylene.

3. The method of claim 1 wherein the solvent is benzene.

4. The method of claim 1 wherein the rhenium compound is rhenium heptoxide.

5. The oxidation of claim 1 wherein said olefin is an alkene.

6. A method for the oxidation of olefins to oxygenated compounds selected from the class consisting of epoxides and ketones of the same total carbons which comprises: contacting hydrocarbon olefins having 3 to 20 carbon atoms with a rhenium compound selected from the group consisting of rhenium oxide, alkali metal, alkaline earth metal and ammonia perrhenates in a liquid reaction medium containing 3 to 90 percent by weight hydrogen peroxide and an organic solvent which is inert under oxidation conditions and which forms a binary water-solvent azeotrope at a temperature from 30° to 100° C., refluxing the liquid reaction medium at the temperature of the water-solvent azeotrope and at a pressure sufficient to maintain the medium as a liquid, removing said water-solvent azeotrope during reflux from said reaction medium.

7. The method of claim 6 wherein the water-solvent azeotrope recovered during reflux is separated to produce water and solvent and the separated solvent is recycled to the reaction medium.

8. The method of claim 6 wherein the solvent is benzene.

9. The method of claim 6 wherein the rhenium compound is rhenium heptoxide.

10. The method of claim 6 wherein the hydrocarbon olefin is propylene.

References Cited

UNITED STATES PATENTS

| | | | |
|---|---|---|---|
| 2,776,316 | 1/1957 | Baldwin | 260—604 |
| 3,316,279 | 4/1967 | Fenton | 260—348.5 |
| 3,331,871 | 7/1967 | Ziegler et al. | 260—533 |
| 3,369,049 | 2/1968 | Eden | 260—604 |

FOREIGN PATENTS 1,144,276  2/1963  Germany.

NORMA S. MILESTONE, Primary Examiner

U.S. Cl. X.R.

260—597